(12) United States Patent
Shishido et al.

(10) Patent No.: US 6,407,167 B1
(45) Date of Patent: Jun. 18, 2002

(54) THERMOPLASTIC RESIN COMPOSITION

(75) Inventors: Koichi Shishido; Akira Nakata, both of Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/743,786

(22) PCT Filed: Jul. 16, 1999

(86) PCT No.: PCT/JP99/03833

§ 371 (c)(1),
(2), (4) Date: Mar. 12, 2001

(87) PCT Pub. No.: WO00/04094

PCT Pub. Date: Jan. 27, 2000

(30) Foreign Application Priority Data

Jul. 17, 1998 (JP) .......................................... 10-203541

(51) Int. Cl.⁷ ............................................... C08L 67/00
(52) U.S. Cl. ........................................... 525/67; 525/64
(58) Field of Search ..................... 525/64, 67

(56) References Cited

FOREIGN PATENT DOCUMENTS

EP 0606558 * 7/1994

* cited by examiner

*Primary Examiner*—Ana Woodward
(74) *Attorney, Agent, or Firm*—Oblon, Spivak, McClelland, Maier & Neustadt, P.C.

(57) ABSTRACT

A resin composition comprises (A) a polycarbonate resin, (B) a saturated polyester resin and/or polyester-based elastomer, and (C) a copolymer obtained by graft-polymerizing a given monomer in the presence of latex containing a butadiene-based rubber polymer. The graft copolymer is obtained under the following conditions (a) to (c):

(a) the polymerization formulation is composed of 60 to 90% by weight of the butadiene-based rubber polymer and 10 to 40% by weight of the monomer, (b) the monomer formulation of the latex is composed of 50 to 100% by weight of butadiene and 0 to 50% by weight of vinyl-based monomers copolymerized with butadiene, and (c) the latex has a weight-average particle size from 100 to 200 nm, and the ratio $d_w/d_n$ of the weight-average particle size to the number-average particle size is 1 or more and 3 or less. According to the present invention, a thermoplastic resin composition excellent in production stability and having excellent impact resistance and molded appearance is provided.

14 Claims, No Drawings

THERMOPLASTIC RESIN COMPOSITION

TECHNICAL FIELD

The present invention relates to a thermoplastic resin composition excellent in impact resistance and molded appearance, containing as constituent components a polycarbonate resin, saturated polyester resin and/or polyester-based elastomer, butadiene-based graft copolymer.

BACKGROUND ART

Regarding a method of improving mechanical features a polycarbonate resin and a polyester resin, various methods have conventionally been suggested. Since impact resistance and the like are poor when they are only combined, JP-B No. 55-9435 suggests, for example, a resin composition composed of a polycarbonate resin, polyester resin and butadiene-based graft copolymer. However, such a resin composition manifests an effect of improving impact resistance only when the formulation of a polycarbonate resin, polyester resin and butadiene-based graft copolymer is restricted in a relatively narrow range, and has poor molded article appearance which causes decrease in glossiness, being able to be improved. Also JP-B No. 62-26343, JP-B No. 62-46578 and JP-B No. 7-5825 suggest resin compositions composed of a polycarbonate resin, polyester resin and butadiene-based graft copolymer, however, an effect of imparting impact resistance and molded appearance can not be necessarily satisfied simultaneously in these compositions.

The present invention has been accomplished in view of such current conditions and an object thereof is to provide a thermoplastic resin composition excellent in impact resistance and molded appearance.

DISCLOSURE OF THE INVENTION

According to the present invention solving the above-mentioned problems, there is provided a thermoplastic resin composition comprising
  (A) 4 to 95% by weight of a polycarbonate resin,
  (B) 4 to 95% by weight of a saturated polyester resin and/or polyester-based elastomer, and
  (C) 1 to 40% by weight of a graft copolymer obtained by graft-polymerizing a monomer or monomer mixture containing at least an aromatic vinyl, alkyl methacrylate or alkyl acrylate in the presence of latex containing a butadiene-based rubber polymer,
  wherein the above-mentioned graft copolymer is a copolymer obtained under the following conditions (a) to (c):
    (a) the polymerization formulation is composed of 60 to 90% by weight of the above-mentioned butadiene-based rubber polymer and 10 to 40% by weight of the above-mentioned monomer or monomer mixture,
    (b) the above-mentioned latex is latex obtained by emulsion-polymerizing 50 to 100% by weight of 1,3-butadiene with 0 to 50% by weight of one or more vinyl-based monomers copolymerized with 1,3-butadiene, and
    (c) the above-mentioned latex has a weight-average particle size from 100 to 200 nm, and the ratio $d_w/d_n$ of the weight-average particle size to the number-average particle size is 1 or more and 3 or less.

The present invention provides a thermoplastic resin composition excellent in impact resistance and molded appearance, by adopting the constitution as described above.

BEST MODE FOR CARRYING OUT THE INVENTION

A polycarbonate resin, the component (A) in the present invention can be an aromatic polycarbonate resin, and can be a polycarbonate produced using a dihydroxydiphenyl alkane as the main raw material. For example, polycarbonates obtained by a transesterification method or phosgene method using 2,2-(4,4'-dihydroxydiphenyl)propane (bisphenol A) as a dihydroxy component are preferable. Further, part or all of the above-mentioned bisphenol A may be substituted with other 4,4'-dihydroxydiphenyl alkane or 4,4'-dihydroxydiphenylsulfone, 4,4'-dihydroxydiphenyl ether and the like, and two or more of them may also be mixed and used.

The content of the component (A) polycarbonate resin is from 4 to 95% by weight based on 100% by weight of the whole amount of a thermoplastic resin composition of the present invention. By such a content range, a resin composition excellent in impact resistance and molded appearance is obtained.

A saturated polyester resin, the component (B) used in the present invention is a resin obtained by a condensation reaction using an aromatic dicarboxylic acid or ester-forming derivative thereof and alkylene glycol as the main components. Examples of the aromatic dicarboxylic acid include terephthalic acid, isophthalic acid, naphthalenedicarboxylic acid and the like. Examples of the alkylene glycol include ethylene glycol, propylene glycol, tetramethylene glycol, hexamethylene glycol and the like. In addition to them, other dicarboxylic acids and glycols may also be copolymerized in small amount, if necessary. Examples of the preferable saturated polyester resin include polytetramethylene terephthalate, polyethylene terephthalate and a mixture thereof.

A polyester-based elastomer, the component (B) in the present invention is a block copolymer having a polyester segment having high melting point and a polymer segment having low melting point.

The polyester segment having high melting point is a polyester obtained by a condensation reaction of an aromatic dicarboxylic acid with an alkylene glycol. Examples of the aromatic dicarboxylic acid include terephthalic acid, isophthalic acid, naphthalene dicarboxylic acid and the like. Examples of the alkylene glycol include ethylene glycol, propylene glycol, tetramethylene glycol, hexamethylene glycol and the like. In addition to them, other dicarboxylic acids and glycols may also be copolymerized in small amount, if necessary. Examples of the preferable polyester include polytetramethylene terephthalate, polyethylene terephthalate and a mixture thereof.

On the other hand, the polymer segment having low melting point is composed of a polymer having a molecular weight from 400 to 20000 such as a polyalkylene ether glycol, aliphatic polyester and the like. Disclosed as examples of the polyalkylene ether glycol are poly(ethylene oxide) glycol, poly(tetramethylene oxide) glycol, poly(propylene oxide) glycol and a mixture thereof. Examples of the aliphatic polyester include polyesters obtained from an aliphatic dicarboxylic acid having 2 to 12 carbon atoms and an aliphatic glycol having 2 to 10 carbon atoms. Examples of the preferable polymer segment having low melting point include polyethylene adipate, polytetramethylene adipate, polyethylene sebacate, polyneopentyl sebacate, polyhexamethylene azelate, poly-ε-caprolactone and the like. The proportion of these polymer segments having low melting point in the polyester-based elastomer is preferably from 2 to 80% by weight.

The total content of the component (B) saturated polyester resin and/or polyester-based elastomer is from 4 to 95% by weight based on 100% by weight of the whole amount of the resin composition. By such a content range, a resin composition excellent in impact resistance and molded appearance is obtained.

A graft copolymer, the component (C) in the present invention is a graft copolymer obtained by graft-polymerizing a monomer or monomer mixture containing at least an aromatic vinyl, alkyl methacrylate or alkyl acrylate in the presence of latex containing a butadiene-based rubber polymer, and this copolymer is obtained under the following conditions (a) to (c).

(a) The polymerization formulation is composed of 60 to 90% by weight of the butadiene-based rubber polymer and 10 to 40% by weight of the monomer or monomer mixture, (b) The latex is latex obtained by emulsion-polymerizing 50 to 100% by weight of 1,3-butadiene with 0 to 50% by weight of one or more vinyl-based monomers copolymerized with 1,3-butadiene, and (c) The latex has a weight-average particle size from 100 to 200 nm, and the ratio $d_w/d_n$ of the weight-average particle size to the number-average particle size is 1 or more and 3 or less.

By using a graft copolymer satisfying the above-mentioned conditions, a resin composition excellent in impact resistance and molded appearance is obtained.

The latex containing a butadiene-based rubber polymer is composed of a monomer composition containing 50 to 100% by weight of 1,3-butadiene and 0 to 50% by weight of one or more vinyl-based monomers copolymerized with 1,3-butadiene. Examples of the vinyl-based monomer include aromatic vinyls such as α-methylstyrene and the like, alkyl methacrylates such as methyl methacrylate, ethyl methacrylate and the like, alkyl acrylates such as ethyl acrylate, n-butyl acrylate and the like, unsaturated nitrites such as acrylonitrile, methacrylonitrile and the like, vinyl ethers such as methyl vinyl ether, butyl vinyl ether and the like, halogenated vinyls such as vinyl chloride, vinyl bromide and the like, halogenated vinylidenes such as vinylidene chloride, vinylidene bromide and he like, vinyl-based monomers having a glycidyl group such as glycidyl acrylate, glycidyl methacrylate, allyl glycidyl ether, ethylene glycol glycidyl ether and the like.

Further, there can also used cross-linking monomers together, such as aromatic polyfunctional vinyl compounds such as divinylbenzene, divinyltoluene and the like, polyhydric alcohols ethylene glycol dimethacrylate, 1,3-butanediol diacrylate and the like, trimethacrylates, triacrylates, allyl carboxylates such as allyl acrylate, allyl methacryalte and the like, di and tri-allyl compounds such as diallyl phthalate, diallyl sebacate, triallyltriazine and the like.

The above-mentioned vinyl-based monomers and cross-linking monomers can be used alone or in combination of two or more. In polymerizing a butadiene-based rubber polymer, chain transfer agents such as t-dodecylmercaptane, n-octylmercaptane, α-methylstyrene and the like can be used, if necessary.

As the method for polymerizing latex containing a butadiene-based rubber polymer, an emulsion polymerization method is used, and the polymerization can be appropriately used at temperatures in the range from 40 to 80° C. depending on the kind of a polymerization initiator. As the emulsifier, known emulsifiers can appropriately be used. Before initiation of the polymerization, seed latex composed of styrene and the like may previously be charged, for example. As the polymerization method, a multi-stage emulsification polymerization is preferable. Namely, it is preferable that part of monomers used in the polymerization is previously be charged in the reaction system, and after initiation of the polymerization, the remaining monomers are added in one time, added separately or added continuously. By adopting such as a polymerization method, excellent polymerization stability is obtained, and latex having desired particle size and particle size distribution can be obtained stably. Further, by polymerizing the component (C) graft copolymer using latex obtained by the above-mentioned polymerization method, a resin composition excellent in impact resistance and molded appearance is obtained. When a multi-stage emulsion polymerization is conducted, the monomer formulation charged initially and the monomer formulation charged subsequently may be the same or different.

In the butadiene-based rubber polymer, the weight-average particle size ($d_w$) is from 100 to 200 nm, preferably from 130 to 180 nm, and the ratio ($d_w/d_n$) of the weight-average particle size ($d_w$) to the number-average particle size ($d_n$) is from 1 or more and 3 or less, preferably 1 or more and 2 or less. One of features of the present invention is that the average particle size and particle size distribution are specified as described above, and by this, desired structural control can be suitably effected in obtaining the component (C), and a resin composition having high quality can be obtained stably. Specifically, a resin composition having effectively improved impact resistance can be obtained while maintaining the appearance and glossiness of a molded article.

A graft copolymer, the component (C) in the present invention is obtained by adding a monomer or monomer mixture containing at least an aromatic vinyl, alkyl methacrylate or alkyl acrylate, further adding, if necessary, a vinyl-based monomer copolymerized therewith, and grafting them, in the presence of butadiene-based rubber polymer latex having the above-mentioned constitution.

In the present invention, as the monomer used in the graft polymerization, there can be used aromatic vinyls such as styrene, α-methylstyrene and various halogen-substituted and alkyl-substituted styrenes, alkyl methacrylates such as methyl methacrylate, ethyl methacryalte and the like, alkyl acrylates such as ethyl acrylate, n-butyl acrylate and the like, unsaturated nitriles such as acrylonitrile, methacrylonitrile and the like, vinyl-based monomers having a glycidyl group such as glycidyl acrylate, glycidyl methacryalte, allyl glycidyl ether, ethylene glycol glycidyl ether and the like, and monomer mixtures with the above-mentioned cross-linking monomer. These monomer can be used alone or in combination of two or more.

The amount of a monomer or monomer mixture used in the graft polymerization is from 10 to 40% by weight based on 60 to 90% by weight of a butadiene-based rubber polymer. When the amount of a monomer or monomer mixture used in the graft polymerization is too large, an effect of improving impact resistance decreases, and when too small, the dispersion of a graft copolymer (C) in a resin composition is insufficient, and the appearance of a molded article is poor, and glossiness deteriorates.

Further, in producing a graft copolymer, there can be used as a polymerization initiator a persulfate salt such as potassium persulfate, ammonium persulfate, sodium persulfate and the like, an organic peroxide such as t-butyl hydroperoxide, cumene hydroperoxide, benzoyl peroxide, lauroyl peroxide, diisopropylbenzene hydroperoxide and the like, an azo compound such as azobisisobutyronitrile, azobisisovaleronitrile and the like, or a redox initiator obtained by combining the above-mentioned compound with a sulfite salt, hydrogen sulfite salt, thiosulfate salt, metal (I) salt, sodiumformaldehyde sulfoxylate, dextrose and the like, if necessary.

As the graft polymerization method, an emulsion polymerization method is used. The polymerization can be appropriately effected at temperatures in the range from 40 to 80° C. depending on the kind of the polymerization initiator. As the emulsifier, known emulsifiers can appropriately be used. The polymerization is preferably conducted according to a multi-stage graft polymerization method. Namely, it is preferable that latex is previously charged in the reaction system and monomers to be grafted are added separately, or added continuously. By adopting such a polymerization method, a graft copolymer having a desired structure can be obtained relatively easily.

As the multi-stage polymerization method, a multi-stage graft polymerization method in which an alkyl methcryalte and alkyl acrylate are polymerized in the first stage, an aromatic vinyl is polymerized in the second stage and an alkyl methacrylate is polymerized in the third stage, or a multi-stage graft polymerization method in which an alkyl methacryalte is polymerized in the first stage, an aromatic vinyl is polymerized in the second stage and an alkyl methacrylate is polymerized in the third stage is desirably adopted. By this method, effects as described below are obtained.

Firstly, a graft copolymer having a desired structure can be obtained more easily, and further, production stability and quality stability are also excellent.

Secondly, impact resistance is improved further remarkably by using the component (C) obtained in the above-mentioned method. The appearance and glossiness of a molded article are also maintained at preferable levels. In obtaining the component (C), though a method of graft-polymerization using a mixture of alkyl (meth)acrylates and aromatic vinyls is envisaged, the above-mentioned tree-stage polymerization can obtain further larger effect of improving impact resistance.

Though the reason for obtaining the above-mentioned effect is not necessarily apparent, it is estimated that, in the present invention, since a butadiene-based rubber polymer having given particle size and particle size distribution is used as a starting material of graft polymerization, when the above-mentioned multi-stage graft polymerization is effected, morphology is suitably controlled due to synergic effect of them, resultantly, production stability and quality stability become excellent, and impact resistance, appearance of a molded article, and the like are improved.

As the specific means of the above-mentioned multi-stage polymerization, there can be adopted, for example, the following methods.

(1) A multi-stage graft polymerization method in which to a butadiene-based rubber polymer, methyl methacrylate and n-butyl acrylate are polymerized in the first stage, styrene is polymerized in the second stage and methyl methacryalte is polymerized in the third stage.

(2) A multi-stage graft polymerization method in which to a butadiene-based rubber polymer, methyl methacrylate is polymerized in the first stage, styrene is polymerized in the second stage and methyl methacryalte is polymerized in the third stage.

The resulted graft copolymer latex is heat-treated to be solidified, appropriately using a coagulant such as an acid like sulfuric acid, hydrochloric acid, phosphoric acid and the like or a salt like calcium chloride, sodium chloride and the like, with or without adding a suitable antioxidant or additive, then, dehydrated and washed, subsequently, dried or spray-dried to give a graft copolymer (C) in the form of a powder.

The content of the component (C) graft copolymer is from 1 to 40% by weight based on 100% by weight of the whole amount of a resin composition. By adopting such a content range, a resin composition excellent in impact resistance and molded appearance is obtained.

As the use of a thermoplastic resin composition of the present invention, automatic parts and the like are listed. In the case of automatic parts use, particularly excellent appearance is necessary, and the glossiness is desirably 80% or more.

A method for preparing a thermoplastic resin composition of the present invention is not particularly restricted, and the thermoplastic resin composition can be produced by various methods such as a method in which powders or granules are mixed by a known technology, for example, a Henschel mixer, tumbler and the like, the mixture is melt-mixed by an extruder, kneader, mixer and the like, a method in which into previously melted components, other components are mixed sequentially, further a method in which a mixture is molded directly by an injection molding machine, and the like.

To a thermoplastic resin composition of the present invention, stabilizers against heat or light, for example, phenol-based stabilizers, phosphite-based stabilizers, ultraviolet absorbers, amine-based stabilizers may be added. Further, anti-hydrolysis modifiers, for example, epoxy-based modifiers may also be added. Further, known frame retardants and fillers such as titanium oxide, talk and the like, dyes and pigments, plasticizers and the like can be added, if necessary.

The present invention will be illustrated in detail below by examples. "Parts" and "%" in examples and comparative examples (excepting "%" of glossiness) indicate "parts by weight" and "% by weight", respectively.

Various physical properties in the following examples and comparative examples were measured by the following methods.

Weight-average particle size $d_w$ and number-average particle size $d_n$

They were measured by a capillary-mode particle size distribution measuring apparatus.

Izod impact

It is measured according to ASTM D-256.

Glossiness

It was measured using a Gardener glossimeter. The incidence angle is 60°.

EXAMPLES AND COMPARATIVE EXAMPLES (a-1) Polymerization of Butadiene-based Rubber Polymer Latex (r-1)

The following composition as a first monomer was charged into a 70 L autoclave, heated and a redox-based initiator was added into the autoclave when the temperature reached 43° C. to initiate the reaction, then, the mixture was further heated up to 65° C.

| First monomer | |
|---|---|
| 1,3-butadiene | 25.5 parts |
| styrene | 4.5 parts |

-continued

| | |
|---|---|
| p-methane hydroperoxide | 0.1 parts |
| sodium pyrophosphate | 0.5 parts |
| potassium oleate | 0.2 parts |
| de-ionized water | 70 parts |
| Redox-based initiator | |
| ferrous sulfate | 0.003 parts |
| dextrose | 0.3 parts |
| de-ionized water | 5 parts |

One hour after the initiation of the polymerization, the initiator was added into the autoclave, and from directly after the addition, a second monomer, de-ionized water and emulsifier were continuously added over 2 hours.

| | |
|---|---|
| Initiator | |
| p-menthane hydroperoxide | 0.2 parts |
| Second monomer | |
| 1,3-butadiene | 59.5 parts |
| styrene | 10.5 parts |
| Emulsifier, de-ionized water | |
| Potassium oleate | 0.8 parts |
| de-ionized water | 75 parts |

The mixture was reacted for 10 hours after the initiation of the polymerization, to obtain butadiene-based rubber polymer latex (r-1).

The resulted butadiene-based rubber polymer latex (r-1) had a particle size $d_w$ of 160 nm and $d_w/d_n$ of 1.5.

(a-2) Polymerization of Butadiene-based Rubber Polymer Latex (r-2)

The following composition as a monomer was charged into a 70 L autoclave, heated and a redox-based initiator was added into the autoclave when the temperature reached 43° C. to initiate the reaction, then, the mixture was further heated up to 65° C.

| | |
|---|---|
| Monomer | |
| 1,3-butadiene | 85 parts |
| styrene | 15 parts |
| p-methane hydroperoxide | 0.3 parts |
| sodium pyrophosphate | 0.5 parts |
| potassium oleate | 1.0 parts |
| de-ionized water | 145 parts |
| Redox-based initiator | |
| ferrous sulfate | 0.003 parts |
| dextrose | 0.3 parts |
| de-ionized water | 5 parts |

They were reacted for 7 hours to obtain to obtain butadiene-based rubber polymer latex (r-2).

The resulted butadiene-based rubber polymer latex (r-2) had a particle size $d_w$ of 90 nm and $d_w/d_n$ of 1.3.

(b-1) Polymerization of Graft Copolymer (C-1)

55 parts of the butadiene-based rubber polymer latex (r-1) obtained in the above-mentioned polymerization (a-1) as a solid component, 1.5 parts of potassium oleate and 0.6 parts of sodiumformaldehyde sulfoxylate were charged into a nitrogen-purged flask, a mixture of 16 parts of methyl methacrylate and 3 parts of n-butyl acrylate and cumene hydroxyperoxide was added dropwise over 1 hour while keeping the inner temperature at 70° C., and the mixture was maintained at the same temperature for 1 hour. The addition amount of cumene hydroxyperoxide was 0.2 parts based on 100 parts of the above-mentioned monomer mixture.

Then, a mixture of 22 parts of styrene and cumene hydroperoxide was added dropwise over 1 hour as the second stage in the presence of the polymer obtained in the former stage, then, maintained for 3 hours. The addition amount cumene hydroxyperoxide was 0.2 parts based on 100 parts of styrene.

Thereafter, a mixture of 4 parts of methyl methacryalte and cumene hydroxyperoxide was added dropwise over 0.5 hours as the third stage, in the presence of the polymers obtained in the first stage and the second stage, then, the mixture was maintained for 1 hour and the polymerization was terminated to give graft copolymer latex. The addition amount cumene hydroxyperoxide was 0.1 part based on 100 parts of methyl methacrylate.

0.5 parts of butylated hydroxytoluene was added to the resulted graft copolymer latex, then, a 0.2% aqueous sulfuric acid solution was added to produce a coagulated material which was heat-treated at 90° C. to be solidified. Thereafter, the coagulated material was washed with hot water, and further dried to give a graft copolymer (C-1).

(b-2) Polymerization of Graft Copolymer (S-1)

65 parts of the butadiene-based rubber polymer latex (r-1) obtained in the above-mentioned polymerization (a-1) as a solid component, 1.5 parts of potassium oleate and 0.6 parts of sodiumformaldehyde sulfoxylate were charged into a nitrogen-purged flask, a mixture of 13 parts of methyl methacrylate and 2 parts of n-butyl acrylate and cumene hydroxyperoxide was added dropwise over 1 hour while keeping the inner temperature at 70° C., then, the mixture was maintained at the same temperature for 1 hour. The addition amount of cumene hydroxyperoxide was 0.2 parts based on 100 parts of the above-mentioned monomer mixture.

Then, a mixture of 17 parts of styrene and cumene hydroperoxide was added dropwise over 1 hour as the second stage in the presence of the polymer obtained in the former stage, then, maintained for 3 hours. The addition amount cumene hydroxyperoxide was 0.2 parts based on 100 parts of styrene.

Thereafter, a mixture of 3 parts of methyl methacryalte and cumene hydroxyperoxide was added dropwise over 0.5 hours as the third stage, in the presence of the polymers obtained in the first stage and the second stage, then, the mixture as maintained for 1 hour and the polymerization was terminated to give graft copolymer latex. The addition amount cumene hydroxyperoxide was 0.1 part based on 100 parts of methyl methacrylate.

0.5 parts of butylated hydroxytoluene was added to the resulted graft copolymer latex, then, a 0.2% aqueous sulfuric acid solution was added to produce a coagulated material which was heat-treated at 90° C. to be solidified. Thereafter, the coagulated material was washed with hot water, and further dried to give a graft copolymer (S-1).

(b-3) Polymerization of graft copolymer (S-2)

75 parts of the butadiene-based rubber polymer latex (r-1) obtained in the above-mentioned polymerization (a-1) as a solid component, 1.5 parts of potassium oleate and 0.6 parts of sodiumformaldehyde sulfoxylate were charged into a nitrogen-purged flask, a mixture of 9 parts of methyl methacrylate and 1 part of n-butyl acrylate and cumene hydroxyperoxide was added dropwise over 1 hour while keeping the inner temperature at 70° C., then, the mixture was maintained at the same temperature for 1 hour. The addition amount of cumene hydroxyperoxide was 0.2 parts based on 100 parts of the above-mentioned monomer mixture.

Then, a mixture of 13 parts of styrene and cumene hydroperoxide was added dropwise over 1 hour as the second stage in the presence of the polymer obtained in the former stage, then, maintained for 3 hours. The addition amount cumene hydroxyperoxide was 0.2 parts based on 100 parts of styrene.

Thereafter, a mixture of 2 parts of methyl methacryalte and cumene hydroxyperoxide was added dropwise over 0.5 hours as the third stage, in the presence of the polymers obtained in the first stage and the second stage, then, the mixture was maintained for 1 hour and the polymerization was terminated to give graft copolymer latex. The addition amount cumene hydroxyperoxide was 0.1 part based on 100 parts of methyl methacrylate.

0.5 parts of butylated hydroxytoluene was added to the resulted graft copolymer latex, then, a 0.2% aqueous sulfuric acid solution was added to produce a coagulated material which was heat-treated at 90° C. to be solidified. Thereafter, the coagulated material was washed with hot water, and further dried to give a graft copolymer (S-2).

(b-4) Polymerization of Graft Copolymer (C-2)

A graft copolymer (C-2) was obtained in the same manner as in (b-3) except that the butadiene-based rubber polymer latex (r-2) obtained in the above-mentioned polymerization (a-2) was used.

(b-5) Polymerization of Graft Copolymer (C-3)

A graft copolymer (C-3) was obtained in the same manner as in (b-3) except that 75 parts of the butadiene-based rubber polymer latex (r-2) obtained in the above-mentioned polymerization (a-2) as a solid component, 1.5 parts of potassium oleate, 0.6 parts of sodiumformaldehyde sulfoxylate and 0.9 parts of sodium chloride were used. When thickened with sodium chloride, the rubber particle had a particle size $d_w$ of 160 nm and $d_w/d_n$ of 9.7.

(b-6) Polymerization of Graft Copolymer (S-3)

65 parts of the butadiene-based rubber polymer latex (r-1) obtained in the above-mentioned polymerization (a-1) as a solid component, 1.5 parts of potassium oleate and 0.6 parts of sodiumformaldehyde sulfoxylate were charged into a nitrogen-purged flask, a mixture of 15 parts of methyl methacrylate and cumene hydroxyperoxide was added dropwise over 1 hour while keeping the inner temperature at 70° C., then, the mixture was maintained at the same temperature for 1 hour. The addition amount of cumene hydroxyperoxide was 0.2 parts based on 100 parts of the above-mentioned monomer mixture.

Then, a mixture of 17 parts of styrene and cumene hydroperoxide was added dropwise over 1 hour as the second stage in the presence of the polymer obtained in the former stage, then, maintained for 3 hours. The addition amount cumene hydroxyperoxide was 0.2 parts based on 100 parts of styrene.

Thereafter, a mixture of 3 parts of methyl methacryalte and cumene hydroxyperoxide was added dropwise over 0.5 hours as the third stage, in the presence of the polymers obtained in the first stage and the second stage, then, the mixture was maintained for 1 hour and the polymerization was terminated to give graft copolymer latex. The addition amount cumene hydroxyperoxide was 0.1 part based on 100 parts of methyl methacrylate.

0.5 parts of butylated hydroxytoluene was added to the resulted graft copolymer latex, then, a 0.2% aqueous sulfuric acid solution was added to produce a coagulated material which was heat-treated at 90° C. to be solidified. Thereafter, the coagulated material was washed with hot water, and further dried to give a graft copolymer (S-3).

(b-7) Polymerization of Graft Copolymer (S-4)

75 parts of the butadiene-based rubber polymer latex (r-1) obtained in the above-mentioned polymerization (a-1) as a solid component, 1.5 parts of potassium oleate and 0.6 parts of sodiumformaldehyde sulfoxylate were charged into a nitrogen-purged flask, a mixture of 9 parts of methyl methacrylate and 1 part of n-butyl acrylate and cumene hydroxyperoxide was added dropwise over 1 hour while keeping the inner temperature at 70° C., then, the mixture was maintained at the same temperature for 1 hour. The addition amount of cumene hydroxyperoxide was 0.2 parts based on 100 parts of the above-mentioned monomer mixture.

Then, a mixture of 13 parts of styrene and cumene hydroperoxide was added dropwise over 1 hour as the second stage in the presence of the polymer obtained in the former stage, then, maintained for 3 hours. The addition amount cumene hydroxyperoxide was 0.2 parts based on 100 parts of styrene.

Thereafter, a mixture of 2 parts of methyl methacryalte and cumene hydroxyperoxide was added dropwise over 0.5 hours as the third stage, in the presence of the polymers obtained in the first stage and the second stage, then, the mixture was maintained for 1 hour and the polymerization was terminated to give graft copolymer latex. The addition amount cumene hydroxyperoxide was 0.1 part based on 100 parts of methyl methacrylate.

0.5 parts of butylated hydroxytoluene was added to the resulted graft copolymer latex, then, a 0.2% aqueous sulfuric acid solution was added to produce a coagulated material which was heat-treated at 90° C. to be solidified. Thereafter, the coagulated material was washed with hot water, and further dried to give a graft copolymer (S-4).

Examples 1 to 2, Examples 5 to 6, Comparative Examples 1 to 5

A bisphenol A type polycarbonate having a viscosity-average molecular weight of about 22000 as the polycarbonate resin (A), a saturated polyester resin and/or polytetramethylene terephthalate having a limiting viscosity [η] of 1.05 as the polyester-based elastomer (B) and the graft copolymers obtained in the above-mentioned reactions (S-1, S-2, S-3, S-4, C-1, C-2, C-3) were weighed in proportions shown in Table 1, mixed for 4 minutes by a Henschel mixer, then, melt-kneaded at a cylinder temperature of 260° C. through a 30 mm φ twin-screw extruder, and shaped in the form of a pellet to obtain various compositions. The compositions were further injection-molded to obtain specimens.

The evaluation results obtained by using these specimens are shown in Table 1.

Thermoplastic resin compositions of the examples of the present invention had excellent molded appearance (glossiness), and excellent impact resistance imparting effect was recognized.

Examples 3 to 4, Examples 7 to 8, Comparative Examples 6 to 8

A bisphenol A type polycarbonate having a viscosity-average molecular weight of about 22000 as the polycarbonate resin (A), a saturated polyester resin and/or polytetramethylene terephthalate having a limiting viscosity [η] of 1.05 as the polyester-based elastomer (B) and the graft copolymers obtained in the above-mentioned reactions (S-1, S-2, S-3, S-4, C-1, C-2, C-3) were weighed in proportions shown in Table 1, mixed for 4 minutes by a Henschel mixer, then, melt-kneaded at a cylinder temperature of 260° C. through a 30 mm φ twin-screw extruder, and shaped in the form of a pellet to obtain various compositions. The compositions were further injection-molded to obtain specimens.

The evaluation results obtained by using these specimens are shown in Table 1.

Thermoplastic resin compositions of the examples of the present invention had changed compounding ratios of the polycarbonate and polyester as compared with Examples 1 to 2 and Examples 5 to 6, however, also in the present cases, had excellent molded appearance (glossiness), and excellent impact resistance imparting effect was manifested.

TABLE 1

|  | poly- carbonate (%) | poly- tetra methylene terephtalate (%) | Graft copolymer | | | | | | | Izod impact strength (J/m) thickness 1/4" notched at 23 °C. |
|---|---|---|---|---|---|---|---|---|---|---|
|  |  |  |  |  | Rubber | | | | | |
|  |  |  | kind | Amount (%) | (%) | Particle size (nm) | dw/dn | Graft (%) | Glossiness (%) |  |
| Comparative Example 1 | 35 | 50 | C-1 | 15 | 55 | 160 | 1.5 | 45 | 92 | 90 |
| Comparative Example 2 | 35 | 50 | C-2 | 15 | 75 | 90 | 1.3 | 25 | 95 | 95 |
| Comparative Example 3 | 35 | 50 | C-3 | 15 | 75 | 160 | 9.7 | 25 | 70 | 460 |
| Comparative Example 4 | 21 | 29 | S-1 | 50 | 65 | 160 | 1.5 | 35 | 59 | 730 |
| Comparative Example 5 | 41 | 58.5 | S-1 | 0.5 | 65 | 160 | 1.5 | 35 | 91 | 72 |
| Example 1 | 35 | 50 | S-1 | 15 | 65 | 160 | 1.5 | 35 | 90 | 770 |
| Example 2 | 35 | 50 | S-2 | 15 | 75 | 160 | 1.5 | 25 | 89 | 790 |
| Comparative Example 6 | 53 | 32 | C-1 | 15 | 55 | 160 | 1.5 | 45 | 93 | 76 |
| Comparative Example 7 | 53 | 32 | C-2 | 15 | 75 | 90 | 1.3 | 25 | 92 | 84 |
| Comparative Example 8 | 53 | 32 | C-3 | 15 | 75 | 160 | 9.7 | 25 | 69 | 360 |
| Example 3 | 53 | 32 | S-1 | 15 | 65 | 160 | 1.5 | 35 | 91 | 730 |
| Example 4 | 53 | 32 | S-2 | 15 | 75 | 160 | 1.5 | 25 | 90 | 745 |

What is claimed is:

1. A thermoplastic resin composition comprising
   (A) 4 to 95% by weight of a polycarbonate resin,
   (B) 4 to 95% by weight of a saturated polyester resin and/or polyester-based elastomer, and
   (C) 1 to 40% by weight of a graft copolymer obtained by graft-polymerizing a monomer or monomer mixture containing at least an aromatic vinyl, alkyl methacrylate or alkyl acrylate in the presence of latex containing a butadiene-based rubber polymer,
   wherein said graft copolymer is a copolymer obtained. under the following conditions (a) to (c):
      (a) the polymerization formulation is composed of 60 to 90% by weight of said butadiene-based rubber polymer and 10 to 40% by weight of said monomer or monomer mixture,
      (b) said latex is latex obtained by emulsion-polymerizing 50 to 100% by weight of 1,3-butadiene with 0 to 50% by weight of one or more vinyl-based monomers copolymerized with 1,3-butadiene, and
      (c) said latex has a weight-average particle size from 100 to 200 nm, and the ratio $d_w/d_n$ of the weight-average particle size to the number-average particle size is from 1 to 3.

2. The thermoplastic resin composition according to claim 1 wherein said component (A) is an aromatic polycarbonate resin.

3. The thermoplastic resin composition according to claim 1 wherein said component (B) is composed of a saturated polyester resin.

4. The thermoplastic resin composition according to claim 1 wherein said component (B) is composed of polyester-based elastomer.

5. The thermoplastic resin composition according to claim 1 wherein said component (B) is composed of a saturated polyester resin and polyester-based elastomer.

6. The thermoplastic resin composition according to claim 3 wherein said saturated polyester resin is a polyalkylene terephthalate.

7. The thermoplastic resin composition according to claim 6 wherein said polyalkylene terephthalate is polytetramethylene terephthalate.

8. The thermoplastic resin composition according to claim 6 wherein said polyalkylene terephthalate is polyethylene terephthalate.

9. The thermoplastic resin composition according to claim 1 wherein said latex is latex obtained by a multi-stage emulsion polymerization method.

10. The thermoplastic resin composition according to claim 1 wherein said butadiene-based rubber polymer is a copolymer is composed of butadiene and styrene.

11. The thermoplastic resin composition according to claim 1 wherein said component (C) is a graft copolymer obtained by a multi-stage graft polymerization method in which an alkyl methacrylate and alkyl acrylate are polymerized in the first stage, an aromatic vinyl is polymerized in the second stage and an alkyl methacrylate is polymerized in the third stage, to a butadiene-based rubber polymer.

12. The thermoplastic resin composition according to claim 11 wherein said component (C) is a graft copolymer obtained by a multi-stage graft polymerization method in which methyl methacrylate and n-butyl acrylate are polymerized in the first stage, styrene is polymerized in the second stage and methyl methacrylate is polymerized in the third stage, to a butadiene-based rubber polymer.

13. The thermoplastic resin composition according to claim 1 wherein said component (C) is a graft copolymer obtained by a multi-stage graft polymerization method in which an alkyl methacrylate is polymerized in the first stage, an aromatic vinyl is polymerized in the second stage and an alkyl methacrylate is polymerized in the third stage, to a butadiene-based rubber polymer.

14. The thermoplastic resin composition according to claim 13 wherein said component (C) is a graft copolymer obtained by a multi-stage graft polymerization method in which methyl methacrylate is polymerized in the first stage, styrene is polymerized in the second stage and methyl methacrylate is polymerized in the third stage, to a butadiene-based rubber polymer.

* * * * *